US012481754B2

(12) United States Patent
Veshchikov et al.

(10) Patent No.: US 12,481,754 B2
(45) Date of Patent: Nov. 25, 2025

(54) DATA PROCESSING SYSTEM AND METHOD FOR MITIGATING A MALWARE ATTACK

(71) Applicant: NXP B.V., Eindhoven (NL)

(72) Inventors: Nikita Veshchikov, Brussels (BE); Christine van Vredendaal, Veldhoven (NL)

(73) Assignee: NXP B.V., Eindhoven (NL)

( * ) Notice: Subject to any disclaimer, the term of this patent is extended or adjusted under 35 U.S.C. 154(b) by 260 days.

(21) Appl. No.: 18/323,059

(22) Filed: May 24, 2023

(65) Prior Publication Data

US 2024/0394364 A1  Nov. 28, 2024

(51) Int. Cl.
*G06F 21/55* (2013.01)
*G06F 21/56* (2013.01)

(52) U.S. Cl.
CPC .......... *G06F 21/554* (2013.01); *G06F 21/565* (2013.01); *G06F 2221/034* (2013.01)

(58) Field of Classification Search
CPC ............ G06F 21/554; G06F 21/565; G06F 2221/034; G06F 12/14; G06F 21/567; G06F 2212/1052; G06F 21/566; H04L 63/1491
See application file for complete search history.

(56) References Cited

U.S. PATENT DOCUMENTS

| | | | |
|---|---|---|---|
| 7,644,136 B2 | 1/2010 | Rose et al. | |
| 9,807,115 B2 * | 10/2017 | Kolton | ................ H04L 63/1491 |
| 10,607,009 B2 | 3/2020 | Dahan | |
| 11,010,469 B2 * | 5/2021 | Aharoni | ................. G06F 21/554 |
| 11,030,112 B2 * | 6/2021 | Tsirkin | ................ G06F 12/1441 |
| 11,032,319 B1 | 6/2021 | Roundy et al. | |
| 11,200,320 B2 | 12/2021 | Chelarescu et al. | |
| 11,223,649 B2 | 1/2022 | Wu et al. | |
| 11,328,064 B2 | 5/2022 | Mueller-Wicke et al. | |
| 11,347,849 B2 * | 5/2022 | Hicks | .................. G06F 12/1458 |
| 2017/0287532 A1 * | 10/2017 | Branch | .................... G06F 12/10 |
| 2018/0324214 A1 | 11/2018 | Schoenherr | |
| 2019/0004972 A1 * | 1/2019 | Bear | ...................... G06F 12/145 |
| 2020/0204589 A1 | 6/2020 | Strogov et al. | |
| 2022/0027471 A1 * | 1/2022 | Levy | ..................... G06F 21/565 |

FOREIGN PATENT DOCUMENTS

| | | | | |
|---|---|---|---|---|
| EP | 3756121 B1 | 3/2022 | | |
| JP | 7112449 B2 * | 8/2022 | ............ | G06F 21/45 |
| WO | 2022132911 A1 | 6/2022 | | |

* cited by examiner

*Primary Examiner* — Christopher A Revak

(57) ABSTRACT

A method is provided for mitigating a malware attack to a data processing system. The method may include initializing a malware stagnation file in the data processing system. The malware stagnation file can generate a range of addresses that do not exist in the memory and are not mapped to any applications of the data processing system. During operation of the data processing system, an address may be received by the data processing system for a read or write operation to the memory. If it is determined that the address defines an entry point of the malware stagnation file, it may be assumed that the requestor is malware and the malware stagnation file translates the address to an address that does not exist in the memory and allow access. The malware stagnation file may provide the non-existent addresses to the malware for as long as the malware makes requests.

20 Claims, 4 Drawing Sheets

DATA PROCESSING SYSTEM AND METHOD FOR MITIGATING A MALWARE ATTACK

BACKGROUND

Field

This disclosure generally relates to data processing, and more particularly, to a data processing system and method for mitigating a malware attack.

Related Art

Malware is a type of malicious software designed to cause harm to a computer. There are many different types of malware. One type of malware is called ransomware. Ransomware is a type of malware that prevents use of a data processing system until a ransom is paid for recovery of the data processing system. One of the more problematic types of ransomware is a ransomware that encrypts a user's important files and requires the user to pay for decryption keys for decrypting the encrypted files. This ransomware is sometimes called crypto-ransomware.

Unfortunately, even after payment of the ransom, the decryption keys to recover the encrypted data may not be provided as promised. Therefore, what is needed is a method and data processing system that can detect a crypto-ransomware early in the process of data encryption so that the decryption keys may be located and retrieved from the data processing system while still possible and without paying the ransom.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
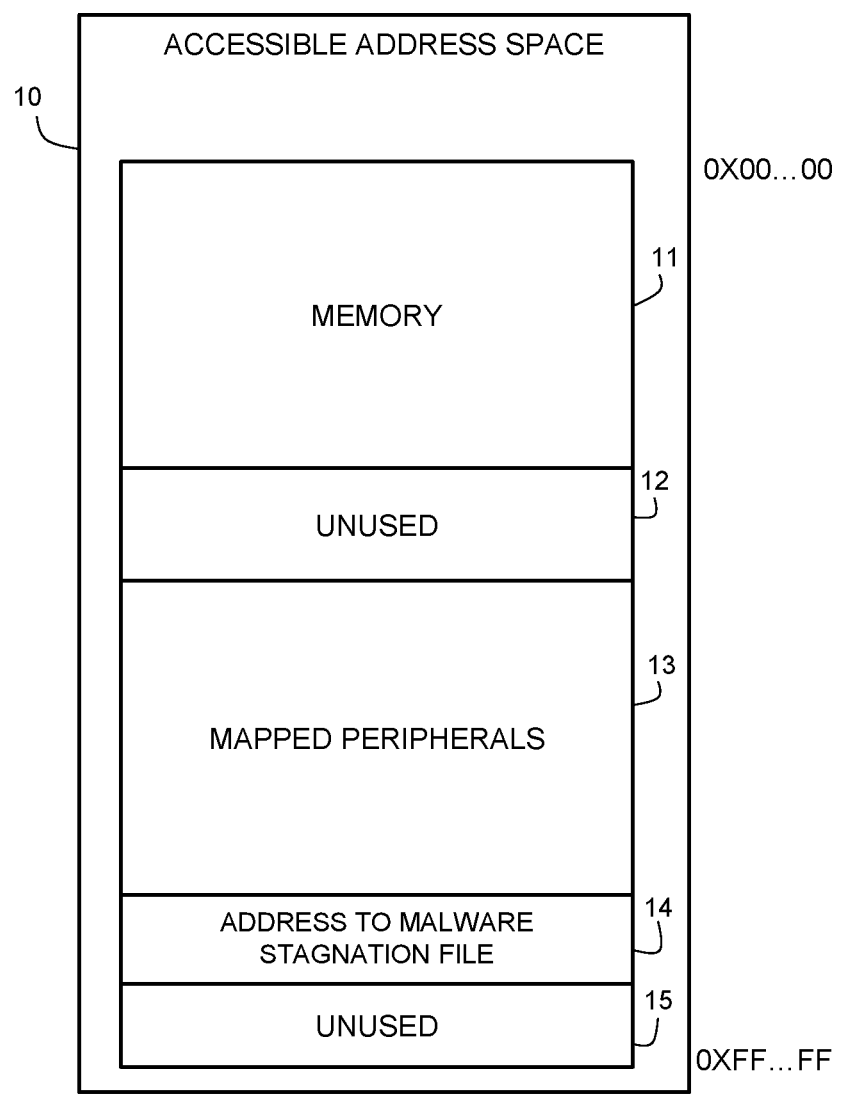
FIG. 1 illustrates a diagram of a memory map in accordance with an embodiment.

Generally, there is provided, a method and data processing system for mitigating a malware attack on a data processing system. In one embodiment, the data processing system includes a malware stagnation file. In the event of a malware attack, such as for example, a crypto-ransomware attack, the crypto-ransomware will begin encrypting files on a memory of the data processing system. When a predetermined memory address or file is accessed by the crypto-ransomware, the malware stagnation file is enabled to begin providing addresses from a range of addresses that do not exist in the memory. The malware is allowed to attempt to encrypt the range of addresses. The addresses can be provided to the malware indefinitely, or for as long as requests are made, thus giving extra time to the data processing system to react. However, because the memory location is non-existent, no important data will be encrypted. For example, the data processing system may detect the presence of ransomware, make a snapshot of the process, and attempt to extract a decryption key from the malware. Because ransomware usually targets more than one system, the malware stagnation file can be used by multiple systems in the same network. That is, if multiple systems are processing the malware stagnation file at the same time, this can be used to detect an attack on the network. The multiple systems may include, e.g., multiple personal computers in a network, internet of things (IoT) devices, and sensors in a factory.

In accordance with an embodiment, there is provided, a method including: initializing a malware stagnation file in a data processing system; receiving an address for a read or write operation to a memory of the data processing system; determining that the address defines an entry point of the malware stagnation file, wherein the malware stagnation file includes a range of addresses that do not exist in the memory and are not mapped to any applications of the data processing system; and allowing the malware to access the range of addresses indefinitely. The malware stagnation file translates received addresses to virtual addresses, and read or write operations are allowed to occur indefinitely to the range of addresses. The method may further include the address that defines an entry point is to an unmapped portion of the memory. The method may further include detecting, by an operating system of the data processing system, a malware, and calling the malware stagnation file in response to the malware being detected. The malware may be ransomware that operates by encrypting the memory. An address selected for the read or write operation may be randomly selected. The data processing system may be part of network of data processing systems, each data processing system including a malware stagnation file. The malware detection file may be implemented as hardware in the data processing system. The address that defines the entry point of the malware stagnation file may further include a plurality of addresses of the memory, wherein each address of the plurality of addresses defines an entry point of the malware stagnation file. Allowing the read or write operation of the translated address may further include, in response to a read operation, returning a random data value.

In accordance with another embodiment, there is provided, a data processing system including: an operating system configured to run on a processor; a memory mapped to provide storage for data and instructions used by applications running on the operating system; and a malware stagnation file, wherein a predetermined address in the memory defines an entry point of the malware stagnation file, wherein the malware stagnation file includes a range of addresses that do not exist in the memory and are not mapped to any other functions of the data processing system, and wherein in response to a request to access the predetermined address, the malware stagnation allowing access to the address and generating subsequent addresses in the range of addresses that do not exist in the memory in response to read and write requests to the memory. The subsequent addresses of the range of addresses may be randomly selected. The predetermined address may be part of the memory that is not mapped for use by any applications running on the operating system. The operating system may be configured to call the malware stagnation file in response to the operating system detecting a malware. The read and write requests to the memory may be generated by malware, wherein the malware is ransomware that operates by encrypting the memory. The malware stagnation file may return a random data value in response to a request for a read operation. The malware detection file may be implemented as hardware in the data processing system.

In accordance with yet another embodiment, there is provided, a method for mitigating a ransomware attack, the method including: initializing a malware stagnation file in a data processing system, wherein the malware stagnation file includes a process for mapping a received request for access to the memory to an address that does not exist in the memory, and wherein a predetermined address in the memory defines an entry point to the malware stagnation file; receiving a request to access the predetermined address of the memory; mapping the request to an address that does not exist in the memory; mapping subsequent requests to access the memory, by the malware stagnation file, to randomly selected addresses that do not exist in the memory; and allowing access to the randomly selected addresses by the malware stagnation file indefinitely, whereby the ransomware attack is allowed to proceed on the randomly selected addresses. The malware detection file may be implemented as hardware on an integrated circuit of the data processing system. Allowing the access to the randomly selected addresses may further include, in response to a read operation, returning a randomly generated data value.

FIG. 1 illustrates a diagram of an example memory map 10 of accessible address space in accordance with an embodiment. Memory map 10 includes, for example, addresses from 0X00 . . . 00 to 0XFF . . . FF in memory 11. Memory 11 may be any type of addressable volatile or non-volatile memory and may be any size of memory. Memory 11 may be divided into various address ranges, each address range may be designated for a particular application. For example, data for peripheral circuits may be mapped to a range of addresses 13. There may be portions of unused memory address ranges such as address ranges 12 and 15. In accordance with an embodiment, an address that serves as an entry point to a malware stagnation file may be located in an otherwise unused address range at address range 14. The malware stagnation file is based on the use of a special range of addresses that do not exist in memory 11 or in the data processing system that includes memory 11. The special range of addresses are not used in any other way, for example, not mapped to peripherals or applications of the data processing system. Preferably, malware stagnation file itself may be stored in a protected memory that is not subject to being encrypted by, e.g., a ransomware. Address range 14 may only be one address.

The malware stagnation file can be implemented in hardware (HW) or in software (SW). In both cases, an operating system (OS) will be able to use the malware stagnation file to trick the ransomware or other types of malware. The HW implementation can be faster and more robust in a case where the OS is compromised.

As mentioned above, an entry point to the malware stagnation file can be mapped to any address, even to a single address. However, to protect a system against being easy to manipulate by, e.g., a side-channel attack into calling the address, it may be desirable to not have an all-0 or all-F address as the entry point.

Note, that the memory map 10 is all the theoretically accessible addresses. The size of the address space may be only limited by the size of registers and memory management of the OS. Moreover, in one embodiment that includes an OS. Processes that run under the OS do not directly access addresses to read and write, but rather perform "system calls" using the OS. The OS "knows" about addresses and does the translation from system calls to addresses and values that are stored in them. In other words, a malware that uses system calls will not be able to know which physical address is used for files being encrypted and may not be able to detect that the addresses being provided are not read addresses of the memory.

During an attack, the malware stagnation file attempts to always provide a "next" byte, or next block of several bytes (typically 4 or 8), for an access of the non-existent range addresses to a program that asks for it. The OS or a hardware malware stagnation peripheral can be triggered into a malware stagnation mode for the non-existent range of addresses after the access of the first address where the entry point address is situated, such as address range 14 in FIG. 1. In this scenario the malware stagnation file will continue to accept read and write requests and provide generated addresses in response to the read and write requests indefinitely as long as requests are made.

In another embodiment, the malware stagnation file entry point address may be located in the middle of mapped memory. For example, the entry point address may be somewhere in the middle of a used space, such as mapped peripherals 13, and may be given a file name that indicates importance and thus serves as a decoy or a honeypot. In such case, normal processes would have to know to avoid it while any malware may use it and will be detected and become "stuck" attempting to encrypt non-existent files.

Figure 2:
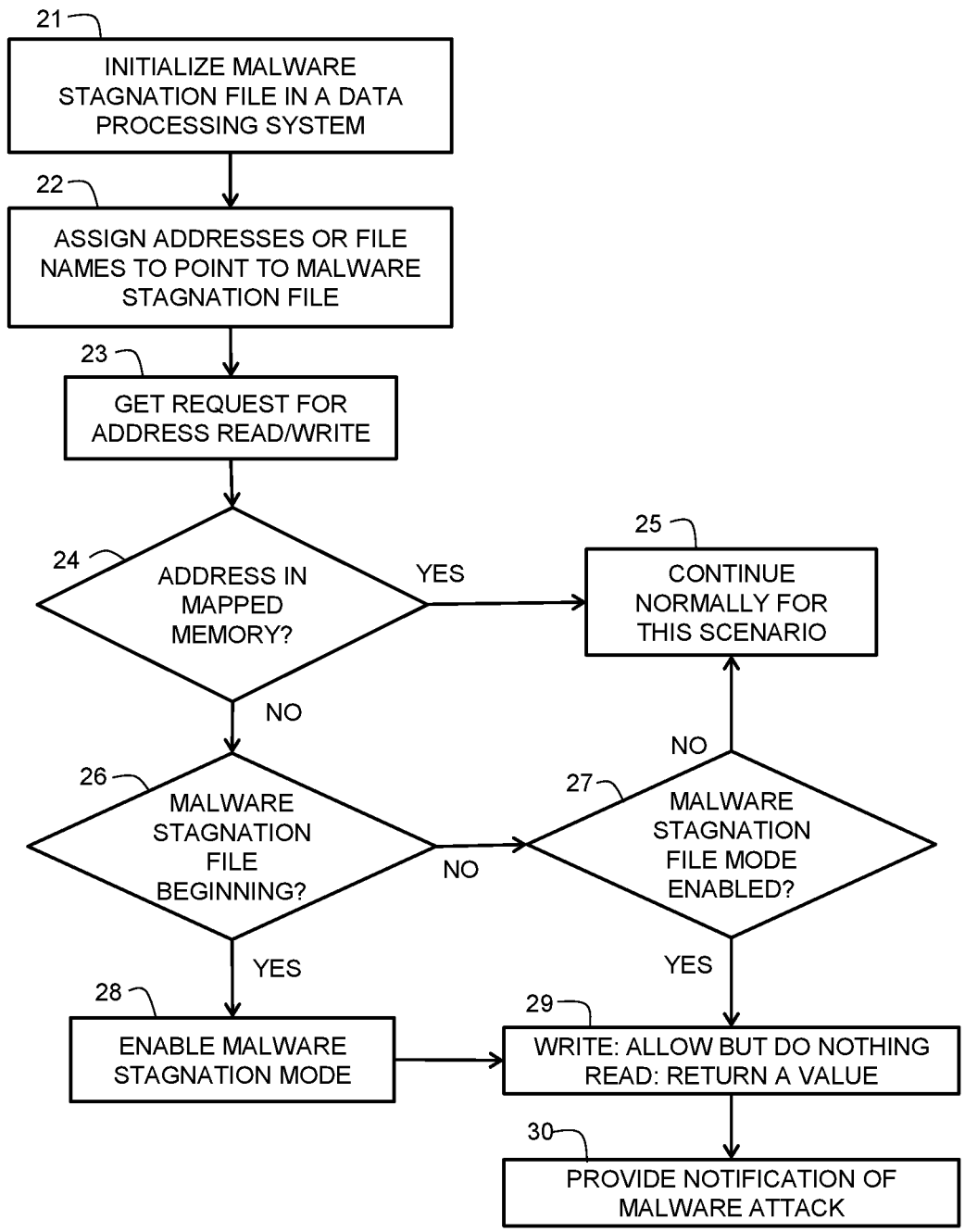
FIG. 2 illustrates a diagram of a method for mitigating a malware attack according to an embodiment.

FIG. 2 illustrates a diagram of method 20 for mitigating a malware attack according to an embodiment. Method 20 begins at block 21. At block 21, a malware stagnation file in a data processing system is initialized. The initialized malware stagnation file will then mitigate a malware attack by causing the malware, such as crypto-ransomware, to encrypt data at non-existent addresses of the memory. The non-existent addresses of the memory may be randomly generated when the malware requests access to a predetermined assigned address that functions as a point of entry to the malware stagnation file. At block 22, an address or file name is assigned to be the predetermined address that will point to the malware stagnation file when requested. At block 23, a request for access to an address for a read or write operation is received by the data processing system. At decision block 24, it is determined if the address is mapped in memory, such as mapped memory region 13 for peripherals in memory 11 of FIG. 1. If the address is mapped in memory, the YES path is taken to block 25, where memory accesses to memory 11 continues normally. If at decision block 24, the address is not in mapped memory, the NO path is taken to decision block 26. At decision block 26, it is determined if the address is the first address to the malware stagnation file. The address may be provided to access an unused portion of the memory. If the answer at decision block 26 is yes, the YES path is taken to block 28 where the malware stagnation mode is enabled. In one embodiment, it may be assumed that a request to access the non-existent address is caused by a malware. If at decision block 26 the address is not the beginning of the malware stagnation file, the NO path is taken to decision block 27. At decision block 27, it is determined if the malware stagnation file mode is enabled. If not, then the address is assumed to not be accessed by malware and program execution continues normally. If at decision block 27, the malware stagnation file is enabled, then malware access is assumed and the YES path is taken to block 29. At block 29, if the address is for a write operation, the write operation is allowed without modification. If the address is for a read operation, a value may be returned. In one embodiment, the value may be randomly generated data. At block 30, an indication of a malware attack may be provided to a user. In one embodiment, the indication may be provided after a certain number of accesses to unmapped memory areas occur.

The value at block 29 in method 20 above can be different depending on the configuration of the module. For example, the value may be a fixed value (e.g. always 0) or the value may be a random value generated by a random number generator. Note, that with abstraction of the OS and the use of system calls by processes running on the data processing system, method 20 may be simplified so that instead of generating non-existent addresses for the malware to read, the OS would simply check if the accessed file is a non-existent file or not.

Figure 3:
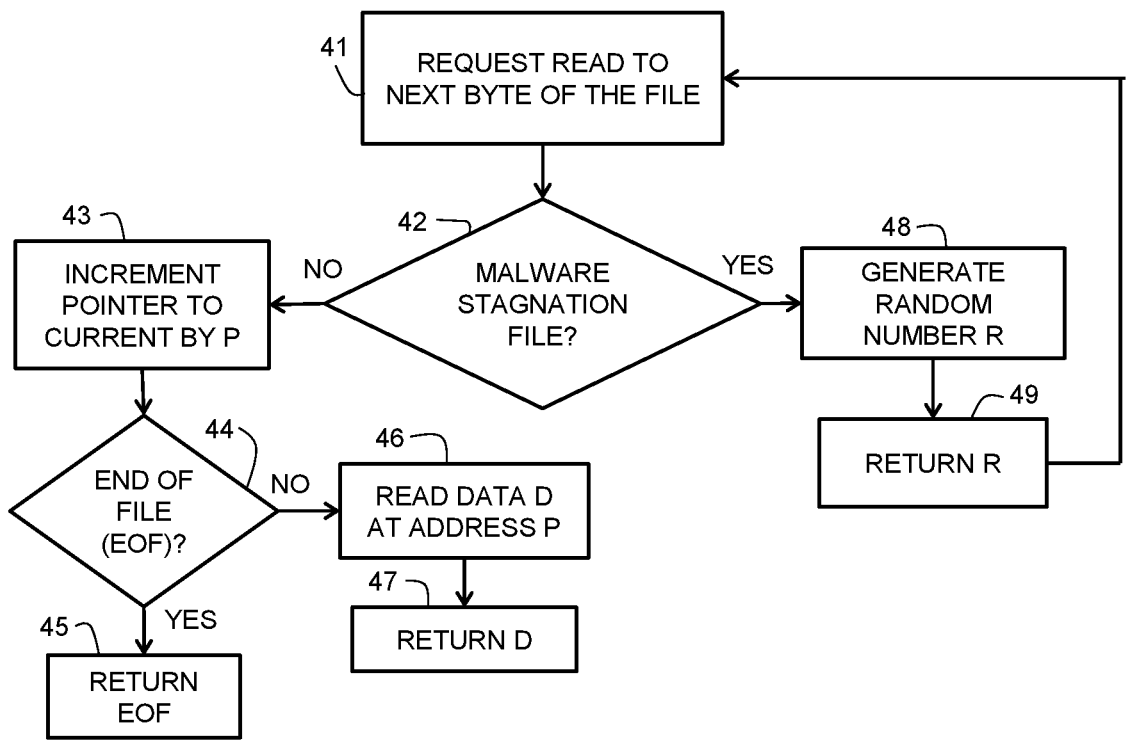
FIG. 3 illustrates a diagram of a method for mitigating a malware attack according to another embodiment.

FIG. 3 illustrates a diagram of method 40 for mitigating a malware attack according to another embodiment. The method begins at block 41. In a series of read requests, at block 41, a read request is received to a next byte of a memory file. At decision block 42, it is determined if the next byte is to an address generated by a malware stagnation file. If the answer is no, the NO path is taken to block 43 where a pointer labeled "P" is incremented by a predetermined amount. At decision block 44, it is determined if the next byte is an end of file (EOF). If the next byte is an EOF, then the EOF is returned at block 45. The returned EOF notifies the requestor that the file ended. If the next byte is not an EOF, then the NO path is taken to block 46 and data D is read at the address pointed to by pointer P. The data D is returned at block 47. Again at decision block 42, if the next byte is to a malware stagnation file generated address that is not in memory 11, the YES path is taken to block 48. At block 48, a random value R is generated, and at block 49, the random value R is returned. The method returns to block 41, and for addresses to the malware stagnation file, the random values R are returned indefinitely. That is, an EOF is never sent so reading operations to the non-existent memory locations generated by malware stagnation file do not end. This gives the data processing system time to detect, e.g., an encryption operation of a ransomware, so that a countermeasure may be provided and the decryption key located.

The malware stagnation file can be used by an OS or other software in several different ways. For example, the malware stagnation file may be used as a honeypot. Usually, crypto-ransomware does not encrypt the entire system because if it did, the user would not be able to boot the data processing system and see that a ransom is demanded. Moreover, it may take a lot of time to encrypt the entire system while the crypto-ransomware wants to encrypt everything as quickly as possible. Thus, the crypto-ransomware may target important files based on their extension, e.g., .zip, .doc, .jpg, etc. that relate to configuration files, videos. or documents, images, pictures, etc.

The malware stagnation file may be used by the OS to place one or many non-existent files in the memory. The memory files can have random names that cannot be predicted by the developers of the malware. When such file is encountered by ransomware, the ransomware will encrypt the non-existent addresses forever and may be delayed and thus have less time to encrypt other potentially important documents before being stopped. That is, the OS or the anti-virus software may have enough time to react and take a snapshot of the crypto-ransomware process, and use the snapshot to recover the decryption keys. If the data processing system has a user that can access any files freely, then the OS may restrict the user's access to these non-existent files.

When an OS or anti-virus software has detected a ransomware in the system, the OS can hijack the process of the ransomware at the moment when it opens a new file to encrypt. Instead of providing the real file to the ransomware, the OS or malware stagnation file can point the ransomware to a non-existent file generated by the malware stagnation file. This is made possible because some processes use OS system calls to get the locations of files to be able to read and write into them. This will make the crypto-ransomware run indefinitely and will give plenty of time to the OS to take a snapshot of the crypto-ransomware memory for the analysis. Similarly, an OS can use the malware stagnation file for mitigating data exfiltration malware where data is stolen from a computer by sending it to an attacker. The malware stagnation file would make the process of data exfiltration take much longer and may even prevent the attacker from stealing any portion of the data.

Also, some protections may be implemented to protect a legitimate user from the consequences of (accidentally) opening or calling a non-existent file created by the malware stagnation file. For instance, a user-defined warning-tag could be added to the file, or a machine learning algorithm may be trained to detect an 'accidental click' versus a 'ransomware operation'. In a graphical user interface (GUI) environment the malware stagnation file may be hidden from the user.

Figure 4:
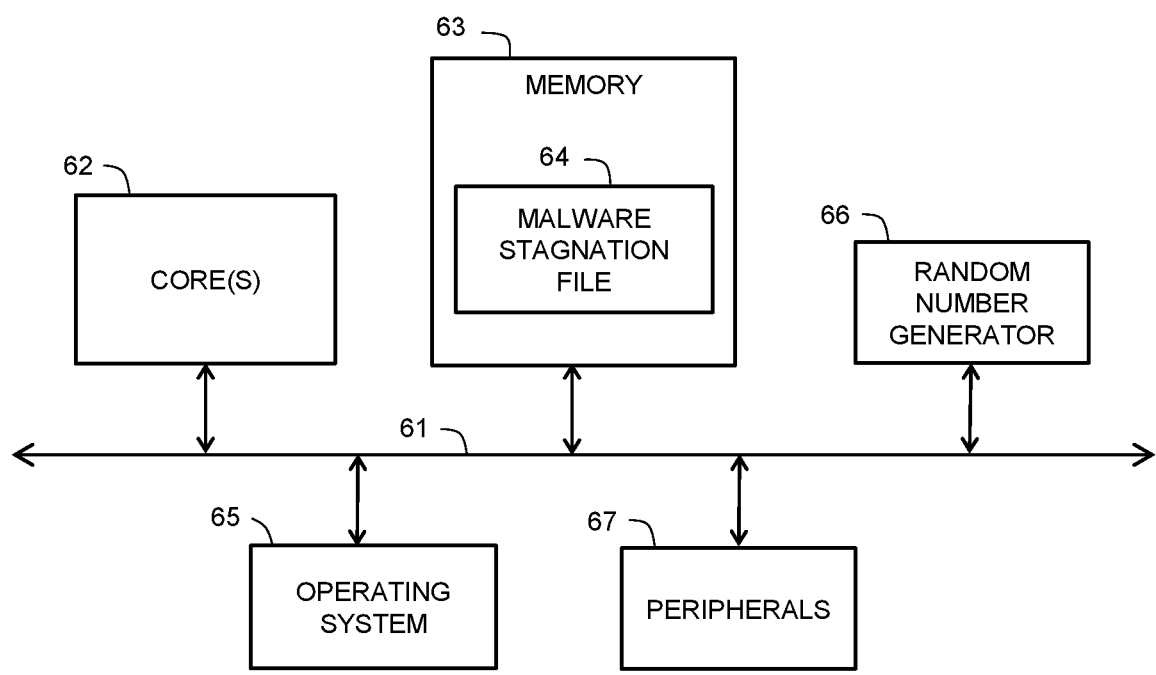
FIG. 4 illustrates a data processing system in accordance with an embodiment.

FIG. 4 illustrates data processing system 60 in accordance with an embodiment. Data processing system 60 may be implemented using one or more integrated circuits and may be used in an implementation of the described embodiments. In one example, data processing system 60 may be a system on a chip (SoC). In another embodiment, data processing system 60 may include multiple integrated circuits (ICs), also known as chips. Data processing system 60 includes data bus or switching network 61 useful for communicating information between circuits of data processing system 60. Connected to bus 61 is one or more processor cores 62, memory 63, malware stagnation file function 64 stored in memory 63, operating system (OS) 65, random number generator 66, and peripherals 67. The one or more processor cores 62 may include any hardware device capable of executing instructions stored in memory 63. For example, processor cores 62 may execute malware stagnation file 64. Processor cores 62 may also execute other applications such as encryption and/or decryption algorithms and other applications. Processor cores 62 may be, for example, a microprocessor, field programmable gate array (FPGA), application-specific integrated circuit (ASIC), or similar device. Processor cores 62 may be implemented in a secure hardware element and may be tamper resistant.

Memory 63 may be any kind of memory, such as for example, L1, L2, or L3 cache or system memory. Memory 63 may include multiple memories, such as one or more volatile memory such as static random-access memory (SRAM) and dynamic RAM (DRAM), and may include non-volatile memory such as flash memory, or other volatile or non-volatile memory. Memory 63 may be provided for use in storing instructions and data to be executed by processor cores 62. A portion of memory 63 may be used to store malware stagnation file 64. Also, portions of memory 63 may be unused as illustrated above in FIG. 1, where an address to malware stagnation file 64 may be located. Also, a portion of memory 63 may be implemented in protected memory such as a secure hardware element or other type of secure storage. Preferably malware stagnation file 64 is stored in a protected, or secured, portion of memory 63, or in a protected memory separate from memory 63.

Random number generator (RNG) 66 may be any type of pseudo random number generator or true random number generator. RNG 66 may be used to provide random addresses or data for malware stagnation file 64 when mitigating a malware attack such as crypto-ransomware attack.

Peripherals 66 may be hardware or software or a combination of hardware and software for enabling communication or any other function. Peripherals 66 may include one or more additional processor cores or other types of processors or memory. Peripherals 66 may include user interfaces for coupling to a display, a mouse, a keyboard, or other input/output device. Peripherals 66 may include one or more circuits for enabling communication with other hardware devices. For example, peripherals 66 may include, or be coupled to, a network interface card (NIC) configured to communicate according to the Ethernet protocol. Also, peripherals 66 may implement a TCP/IP stack for communication according to the TCP/IP protocols.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. The terms "circuit" and "circuitry" may refer to hardware, software, or a combination of hardware and software.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method comprising:
   initializing a malware stagnation file in a data processing system;
   receiving, by a malware, an address for a read or write operation to a memory of the data processing system;
   determining that the address defines an entry point of the malware stagnation file, wherein the malware stagnation file includes a range of addresses that do not exist in the memory and are not mapped to any applications of the data processing system; and
   allowing the malware to access the range of addresses indefinitely.

2. The method of claim 1, wherein the malware stagnation file translates received addresses to virtual addresses, and read or write operations are allowed to occur indefinitely to the range of addresses.

3. The method of claim 1, wherein the address that defines an entry point is to an unmapped portion of the memory.

4. The method of claim 1, further comprising detecting, by an operating system of the data processing system, the malware, and calling the malware stagnation file in response to the malware being detected.

5. The method of claim 1, wherein the malware is ransomware that operates by encrypting the memory.

6. The method of claim 1, wherein an address selected for the read or write operation is randomly selected.

7. The method of claim 1, wherein the data processing system is part of network of data processing systems, each data processing system including a malware stagnation file.

8. The method of claim 1, wherein the malware stagnation file is implemented as hardware in the data processing system.

9. The method of claim 1, wherein the address that defines the entry point of the malware stagnation file further comprises a plurality of addresses of the memory, wherein each address of the plurality of addresses defines an entry point of the malware stagnation file.

10. The method of claim 1, wherein allowing the read or write operation of the translated address further comprises, in response to a read operation, returning a random data value.

11. A data processing system comprising:
    an operating system configured to run on a processor;
    a memory mapped to provide storage for data and instructions used by applications running on the operating system; and
    a malware stagnation file, wherein a predetermined address in the memory defines an entry point of the malware stagnation file, wherein the malware stagnation file includes a range of addresses that do not exist in the memory and are not mapped to any other functions of the data processing system, and wherein in response to a request to access the predetermined address, the malware stagnation file allows access to the address and generates subsequent addresses in the range of addresses that do not exist in the memory in response to read and write requests to the memory.

12. The data processing system of claim 11, wherein the subsequent addresses of the range of addresses are randomly selected.

13. The data processing system of claim 11, wherein the predetermined address is part of the memory that is not mapped for use by any applications running on the operating system.

14. The data processing system of claim 11, wherein the operating system is configured to call the malware stagnation file in response to the operating system detecting a malware.

15. The data processing system of claim 11, wherein the read and write requests to the memory are generated by malware, wherein the malware is ransomware that operates by encrypting the memory.

16. The data processing system of claim 11, wherein the malware stagnation file returns a random data value in response to a request for a read operation.

17. The data processing system of claim 11, wherein the malware stagnation file is implemented as hardware in the data processing system.

18. A method for mitigating a ransomware attack, the method comprising:

- initializing a malware stagnation file in a data processing system, wherein the malware stagnation file includes a process for mapping a received request for access to the memory to an address that does not exist in the memory, and wherein a predetermined address in the memory defines an entry point to the malware stagnation file;
- receiving, from a malware, a request to access the predetermined address of the memory;
- mapping the request to an address that does not exist in the memory;
- mapping subsequent requests to access the memory, by the malware stagnation file, to randomly selected addresses that do not exist in the memory; and
- allowing the malware to access the randomly selected addresses indefinitely.

19. The method of claim 18, wherein the malware stagnation file is implemented as hardware on an integrated circuit of the data processing system.

20. The method of claim 18, wherein allowing the access to the randomly selected addresses further comprises, in response to a read operation, returning a randomly generated data value.

* * * * *